United States Patent
Campbell et al.

(10) Patent No.: US 6,901,801 B2
(45) Date of Patent: Jun. 7, 2005

(54) CAPACITANCE ACCELERATION DERIVATIVE DETECTOR

(75) Inventors: Ray F. Campbell, Newport Beach, CA (US); Joan D. Wada, Anaheim, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/604,523

(22) Filed: Jul. 28, 2003

(65) Prior Publication Data

US 2005/0022597 A1 Feb. 3, 2005

(51) Int. Cl.[7] ........................ G01P 15/125; G01R 27/26
(52) U.S. Cl. ..................................... 73/514.32; 324/661
(58) Field of Search ...................... 324/661; 73/514.32, 73/514.18, 514.17; 361/283.3, 280

(56) References Cited

U.S. PATENT DOCUMENTS

| | | | | |
|---|---|---|---|---|
| 3,226,981 A | * | 1/1966 | Mullins et al. ........... | 73/514.32 |
| 4,987,779 A | * | 1/1991 | McBrien .................. | 73/514.18 |
| 5,325,065 A | * | 6/1994 | Bennett et al. ........... | 324/661 |
| 5,454,266 A | * | 10/1995 | Chevroulet et al. ...... | 73/514.18 |
| 5,456,111 A | * | 10/1995 | Hulsing, II .............. | 73/514.32 |
| 5,597,956 A | * | 1/1997 | Ito et al. .................. | 73/514.18 |
| 5,905,203 A | * | 5/1999 | Flach et al. .............. | 73/514.32 |
| 5,986,497 A | * | 11/1999 | Tsugai ..................... | 327/554 |
| 6,467,346 B1 | * | 10/2002 | Challoner et al. ....... | 73/504.02 |
| 6,731,121 B1 | * | 5/2004 | Hsu et al. ................. | 324/678 |
| 2003/0079543 A1 | * | 5/2003 | Potter ...................... | 73/514.32 |

* cited by examiner

*Primary Examiner*—Helen Kwok
(74) *Attorney, Agent, or Firm*—Artz & Artz, PC

(57) ABSTRACT

A capacitance acceleration derivative detector includes a housing, and a first plate fixed within the housing. A second plate is also fixed within the housing and spaced apart from and in parallel relation to the first plate. A flexure plate is disposed between and in substantially parallel relation to the first and second plates. The flexure plate is coupled to the housing along at least an edge. The flexure plate and first plate define a first distance and the flexure plate and the second plate define a second distance. The first and second distances vary in response to acceleration forces acting upon the flexure plate. The flexure plate and the first fixed plate generate a first charge displacement capacitance signal, and the second fixed plate and the flexure plate generate a second charge displacement capacitance signal. A first transimpedance amplifier receives the first charge displacement capacitance signal and generates a first scaled voltage signal therefrom, and a second transimpedance amplifier receives the second charge displacement capacitance signal and generates a second scaled voltage signal therefrom. An acceleration signal is generated from the first scaled voltage signal and the second scaled voltage signal.

20 Claims, 4 Drawing Sheets

CAPACITANCE ACCELERATION DERIVATIVE DETECTOR

BACKGROUND OF INVENTION

The present invention relates generally to accelerometer systems, and more particularly, to a capacitance acceleration derivative detector. It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in a missile or in a portion of aircraft or spacecraft navigation or guidance systems. Accordingly, the temperature in the operating environment of the accelerometer changes over a wide range. Consequently, acceleration must be measured with a high accuracy over a wide range of temperatures. This is often a difficult and inefficient process for current accelerometer systems.

The disadvantages associated with current capacitive accelerometer systems have made it apparent that a new capacitive accelerometer is needed. The new accelerometer should substantially minimize temperature sensing requirements and should also improve acceleration detection accuracy. The present invention is directed to these ends.

SUMMARY OF INVENTION

In accordance with one aspect of the present invention, a capacitance acceleration derivative detector includes a housing, and a first plate fixed within the housing. A second plate is also fixed within the housing and spaced apart from and in parallel relation to the first plate. A flexure plate is disposed between and in substantially parallel relation to the first and second plates. The flexure plate is coupled to the housing along at least an edge. The flexure plate and first plate define a first distance and the flexure plate and the second plate define a second distance. The first and second distances vary in response to acceleration forces acting upon the flexure plate. The flexure plate and the first fixed plate generate a first charge displacement capacitance signal, and the second fixed plate and the flexure plate generate a second charge displacement capacitance signal. A first transimpedance amplifier receives the first charge displacement capacitance signal and generates a first scaled voltage signal therefrom, and a second transimpedance amplifier receives the second charge displacement capacitance signal and generates a second scaled voltage signal therefrom. An acceleration signal is generated from the first scaled voltage signal and the second scaled voltage signal.

In accordance with another aspect of the present invention, a method for operating a capacitance acceleration derivative detector includes accelerating the flexure plate, thereby causing a first distance between the flexure plate and a first fixed plate to change and thereby causing a second distance between the flexure plate and a second fixed plate to change. A first variable capacitor signal is then generated, and a first scaled voltage signal is generated in response to the first variable capacitor signal. A second variable capacitor signal is generated, and a second scaled voltage signal is generated in response to the second variable capacitor signal. An acceleration signal is generated in response to the first scaled voltage signal and the second scaled voltage signal.

One advantage of the present invention is that it generates a dynamic range of temperature and a granularity sufficient for Inter-Continental Ballistic Missile (ICBM) usage. Additional advantages include that the accelerometer system consumes less power than prior accelerometer systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to a capacitance acceleration derivative detector, particularly suited to the aerospace field. The present invention is, however, applicable to various other uses that may require acceleration detection, such as any system requiring position acceleration detection under extreme conditions, as will be understood by one skilled in the art.

Figure 1:
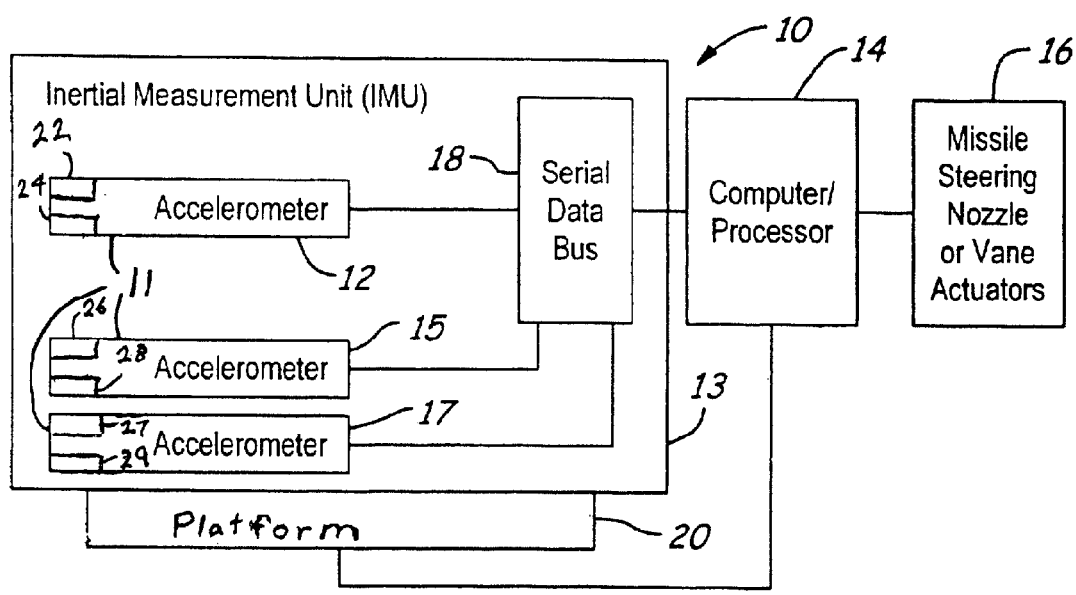
FIG. 1 illustrates an aeronautical system in accordance with one embodiment of the present invention.

Referring to FIG. 1, the missile or aerospace system for controlling acceleration 10, including a capacitance acceleration derivative detector system 11 (CADD) within an inertial measurement unit 13, is illustrated. The aerospace system 10 is merely an illustrative example of an accelerating object and not meant to be limiting. For example, the present capacitance acceleration derivative detector system 11 could be implemented in any accelerating object to sense acceleration forces, including any type of vehicle or missile system, such as a Minuteman III missile system or a Scud missile system.

The illustrated aerospace system 10 includes an inertial measurement unit 13 including three accelerometers (first) 12, (second) 15, (third) 17 and a serial data bus 18. The aerospace system 10 further includes a computer/processor 14, a missile steering unit 16, and a platform 20.

The three accelerometers 12, 15, and 17, are coupled to the inertial platform 20 and the serial bus 18, which transfers information to a computer/processor 14 from the accelerometers 12, 15, 17.

Important to note is that alternate embodiments of the present invention have two or more accelerometers, the three illustrated accelerometers 12, 15, 17 are only one example of a possible arrangement of accelerometers for the accelerometer system 11, and any number of accelerometers can be utilized.

In accordance with one embodiment of the present invention, each accelerometer 12, 15, 17 includes at least one transimpedance amplifier, i.e. first 22 and second 24 for accelerometer 12, third 26 and fourth 28 for accelerometer 15, and fifth 30 and sixth 32 for accelerometer 17. Each accelerometer 12, 15, 17 is a single axis accelerometer generating a robust wide dynamic range of performance. The accelerometers 12, 15, 17 will be discussed in further detail in reference to FIGS. 2 and 3.

The platform 20, whereon the accelerometers 12, 15, 17 are mounted, may be a single flat platform or gimbals and gimbal torque motors (yaw, pitch and roll motors) or any other accelerometer or derivative detector mount known in the art. Platform control will be discussed later.

The processor 14 is coupled to the missile steering nozzle (or vane actuators) unit 16, and the platform 20 and will be discussed in detail later.

Figure 2:
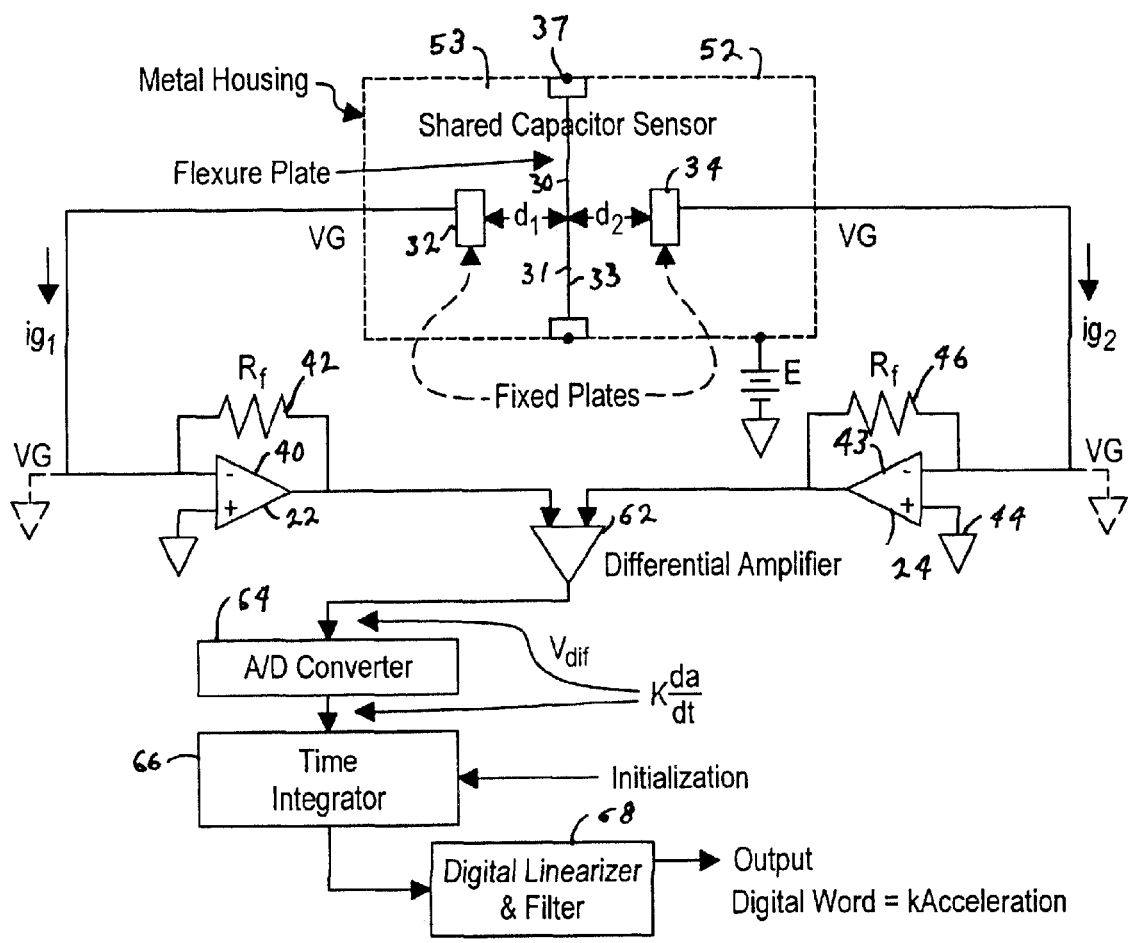
FIG. 2 illustrates a capacitance acceleration derivative detector system in accordance with FIG. 1.
Figure 3:
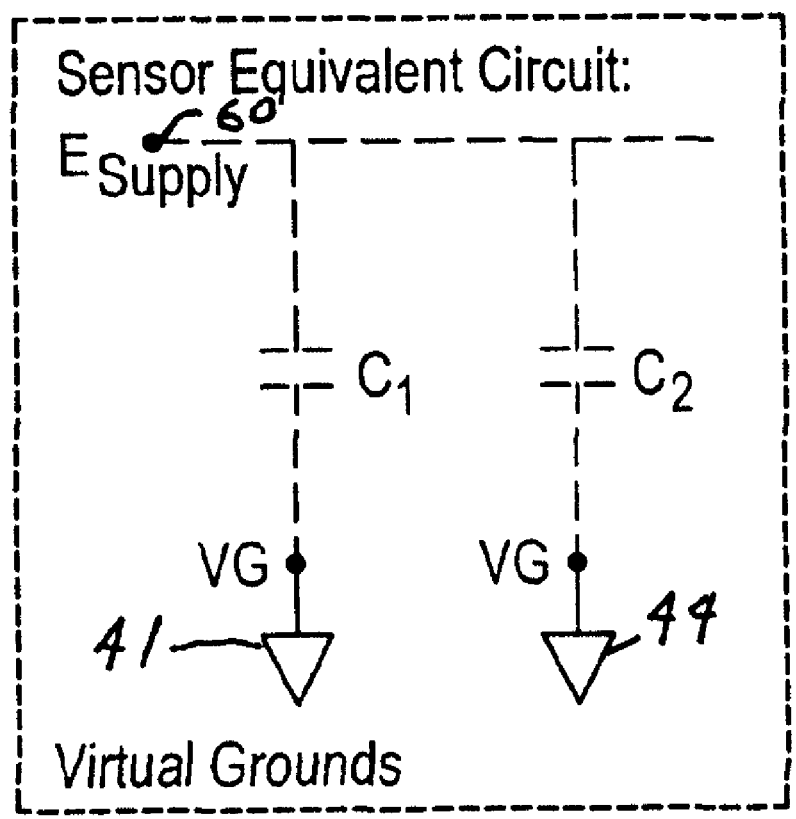
FIG. 3 illustrates an equivalent diagram for the variable capacitance sensor from the capacitance acceleration derivative detector system of FIG. 2.

Referring to FIGS. 2 and 3, an example of a possible configuration for the accelerometer 12 is included as an illustrative example of the accelerometers 12, 15 and 17.

The accelerometer 12 is part of an inertial measurement unit 13 (IMU), as was previously discussed. The accelerometer 12 includes a shared capacitor sensor 52 and housing 53 for the sensor 52, two transimpedance amplifiers 22, 24, a power supply 60, a differential amplifier 62, an analog-to-digital converter 64, a time integrator 66, and a digital linearizer and filter 68.

The shared capacitor sensor 52 includes a single flexure plate 30, two parallel fixed plates 32, 34, and a metal housing structure 53. The shared capacitor sensor 52 generates charge displacement capacitance signals in response to acceleration of the aeronautical system 10, as will be discussed later.

The flexure plate 30 is positioned between the two fixed plates 32, 34 such that the first fixed plate 32 is a first distance ($d_1$) from a first side 31 and the second fixed plate 34 is a second distance ($d_2$) from a second side 33 of the flexure plate 30. The flexure plate 30 is affixed to the metal housing structure 53 through at least a portion of at least one edge 37 of the flexure plate 30.

In the present embodiment, the flexure plate 30 is circular and coupled to the housing 53 at only one edge 37. However, numerous other shapes are included, as will be understood by one skilled in the art. The flexure plate 30 is rigidly fixed to the metal housing structure 53 through almost any manner known in the art. Resultantly, all the system flexure is generated within the flexure plate 30. This generally increases reliability and robustness of the system 10. This, however, generates a non-linear output from the flexure plate 30, which will be discussed regarding the linear lookup table linearizer 68.

A gas or vacuum environment is enclosed within the sensor 52 through the metal housing structure 53 such that there is no interference with the movement of the flexure plate 30 other than the acceleration of the system 10 along a perpendicular axis. During acceleration, the flexure plate 30 flexes according to the reaction force of Newton's second law of motion, force=mass×acceleration (F=ma), causing the distance between the flexure plate 30 and the fixed plates 32, 34 to vary, thus creating the two variable capacitors, one on each side of the flexure plate 30.

The combination of the first fixed plate 32 and the flexure plate 30 forms a first parallel plate capacitor, and the combination of the second fixed plate 34 and the flexure plate 30 forms the second parallel plate capacitor. In FIG. 3, the equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $$C \cong (\epsilon_0 A)/d.$$

where $\epsilon_0$ is the permittivity constant, A is the area of a fixed plate 32 or 34 (if l is the length of one side and the cross section of the plate is square, then $A=l^2$) and d is the effective distance between the flexure plate 30 and one of the fixed plates 32, 34.

The first fixed plate 32 is coupled to the metal housing structure 53 and positioned a first distance ($d_1$) from the flexure plate 30. The first fixed plate 32 and the flexure plate 30 form a first capacitor whose operation is also governed by the equation $$C \cong (\epsilon_0 A)/d.$$

The capacitance of the first fixed plate 32 responds to movement of the flexure plate 30 when $d_1$ either increases or decreases, thereby generating a first charge displacement capacitance signal.

The second fixed plate 34 is also coupled to the metal housing structure 53 and positioned a first distance ($d_1$) from the flexure plate 30. The second fixed plate 34 and the flexure plate 30 form a second capacitor whose operation is governed by the equation $$C \cong (\epsilon_0 A)/d.$$

The second fixed plate 34 responds to movement of the flexure plate 30 when $d_2$ either increases or decreases, thereby generating a second charge displacement capacitance signal.

The distances ($d_1$ and $d_2$) between the flexure plate 30 and the fixed plates 32, 34 are a function of acceleration and are proportional or equal when the system 10 is at rest. Each fixed plate 32, 34 is connected to a respective transimpedance amplifier 22, 24, which generates a respective scaled voltage.

The first fixed plate 32 is coupled to the first transimpedance amplifier 22, and the second fixed plate 34 is coupled to the second transimpedance amplifier 24. The two transimpedance amplifiers 22, 24 are coupled the differential amplifier 62, and the differential amplifier 62 is coupled to the time integrator 66, which is coupled to the LLT 68, which is coupled to the processor 14 (missile operations processor). The processor 14 is coupled to an actuator 16, and to various system components 11, as well as thrusters and attitude control devices.

The transimpedance amplifiers 22, 24 (current to voltage) generate the scaled voltage, which is received in the analog to digital (A/D) converter 64 at $e = i_g R_f$ after passing through the differential amplifier 62.

The embodied first transimpedance amplifier 22 includes components well known in the art. The various components of the first transimpedance amplifier include, but are not limited to, an amplifier 40, a virtual ground 41, and at least one resistor 42. The first transimpedance amplifier 22 receives the charge displacement capacitance signal from the first fixed plate 32 and generates therefrom a scaled voltage, which is proportional to $d_1$.

The second transimpedance amplifier 24 receives the charge displacement capacitance signal from the second fixed plate capacitor and generates therefrom a second scaled voltage signal, which is proportional to $d_2$. The embodied transimpedance amplifier 24 is similar to the first transimpedance amplifier 22 and also includes an amplifier 43, a virtual ground 44, and at least one resistor 46.

The charge q on each capacitor is generated by the equation $q=CE$, where E is the excitation from source 60 and $C=C_0+ka$, k being a scalar constant and a being the acceleration. As the system 10 accelerates along a sensitive axis (x for accelerometer 12, y for accelerometer 15, and z for accelerometer 17), the voltage on the capacitors is held constant. Under acceleration, the charge changes as the capacitors charge according to $dq/dt = E\, dC/dt$ where $dq/dt = i_g$, and $i_g$ is the capacitor current into the virtual ground 41 of the transimpedance amplifier 22.

The scaled voltages are functions of the distances ($d_1$ and $d_2$) respectively. As the flexure plate 30 flexes, one capacitor increases and the other decreases, thereby causing one transimpedance amplifier 22 to increase the first scaled voltage and the other transimpedance amplifier 24 to decrease the second scaled voltage.

The accelerometer is excited with an DC source 60 at one end and grounded at the other. The ground 41 (and 44) is a component of the transimpedance amplifier 22 (or 24). The two capacitive legs (C1 and C2) generate parallel scaled voltage signals that are received in the differential amplifier.

The accelerometer 12 configuration reduces the temperature sensitivity and the DC excitation allowing narrow band analog filtering, both of which enhance the signal-to-noise ratio.

The present configuration reduces the bias error since the instrument is now DC coupled. The circuitry will be a precision design utilizing high speed CMOS, as the accuracy required for performance will require low propagation delays.

The voltage from the two parallel scaled voltage signals gives direct indication of the direction of acceleration. This output is gain adjusted if required in the differential amplifier 62. The sensor output, which is gain adjusted, $V_{dif}$, represents a signal proportional to the time rate of change of acceleration. The voltage polarity generates direct indication of the direction of acceleration.

The A/D converter 64 receives the differential amplifier signals and generates digital values, which are then time integrated in the time integrator 66 to generate acceleration. This output is a digital word whose magnitude is proportional to the acceleration of the system 10 in either direction along the perpendicular axis.

The time integrator 66 performs signal integration in the digital domain after initialization, which may be predetermined at launch or in-flight.

In the digital linearizer and filter 68, statistical filtering of the data somewhere significantly above the maximum flexure frequency followed by a time integration of the digital signal is generated. This reduces the overall noise impact and the exact performance of this filter 68 is determined during, for example, development. This final output represents the integral $\int da/dt$ of the acceleration of the flexure plate 30 from the initialization time.

The digital word (time integrator signal) is filtered and linearized in the digital linearizer and filter 68 for manufacturing and flexure non-uniformities. The filter is embodied, for example, as a multi-pole filter reducing noise to the required time domain level. The filter output is a digital word having a magnitude proportional to the acceleration of the system in either direction along the perpendicular axis. The output of the linearizer 68 is an acceleration signal multiplied by a constant (k).

Statistical filtering of the linearized data above the maximum flexure frequency also occurs in either the digital linearizer and filter 68 or the processor 14 to reduce the overall noise impact on the system 10. The compensation for the non-linearity of the flexure structure and overall transport error is compensated for by the linearizer and filter 68 whose values are established in manufacturing through sampling performance curves.

The processor 14 receives the output signals from the accelerometers 12, 15, 17 and generates a derivative detection signal and response thereto. The processor 14 is embodied as a typical missile or airplane processor, as is familiar in the art. The processor 14 may include the differential amplifier 62, the analog-to-digital converter 64, the time integrator 66, and the linearizer 68 or any combination thereof. The processor 14 may also be a stand alone component receiving signals from the aforementioned components.

The processor 14 also compensates for the non-linearity of the flexure structure and overall transport error by a digital corrector within the processor 14 having a value established in manufacturing by taking samples of performance curves.

The actuator, here embodied as missile steering nozzle or vane actuators 16 receives the derivative detection signal or accelerometer signal from the linearizer 68 and activates system components (e.g. object control devices) in response thereto. System components include for example, thrusters or attitude control devices.

Figure 4:
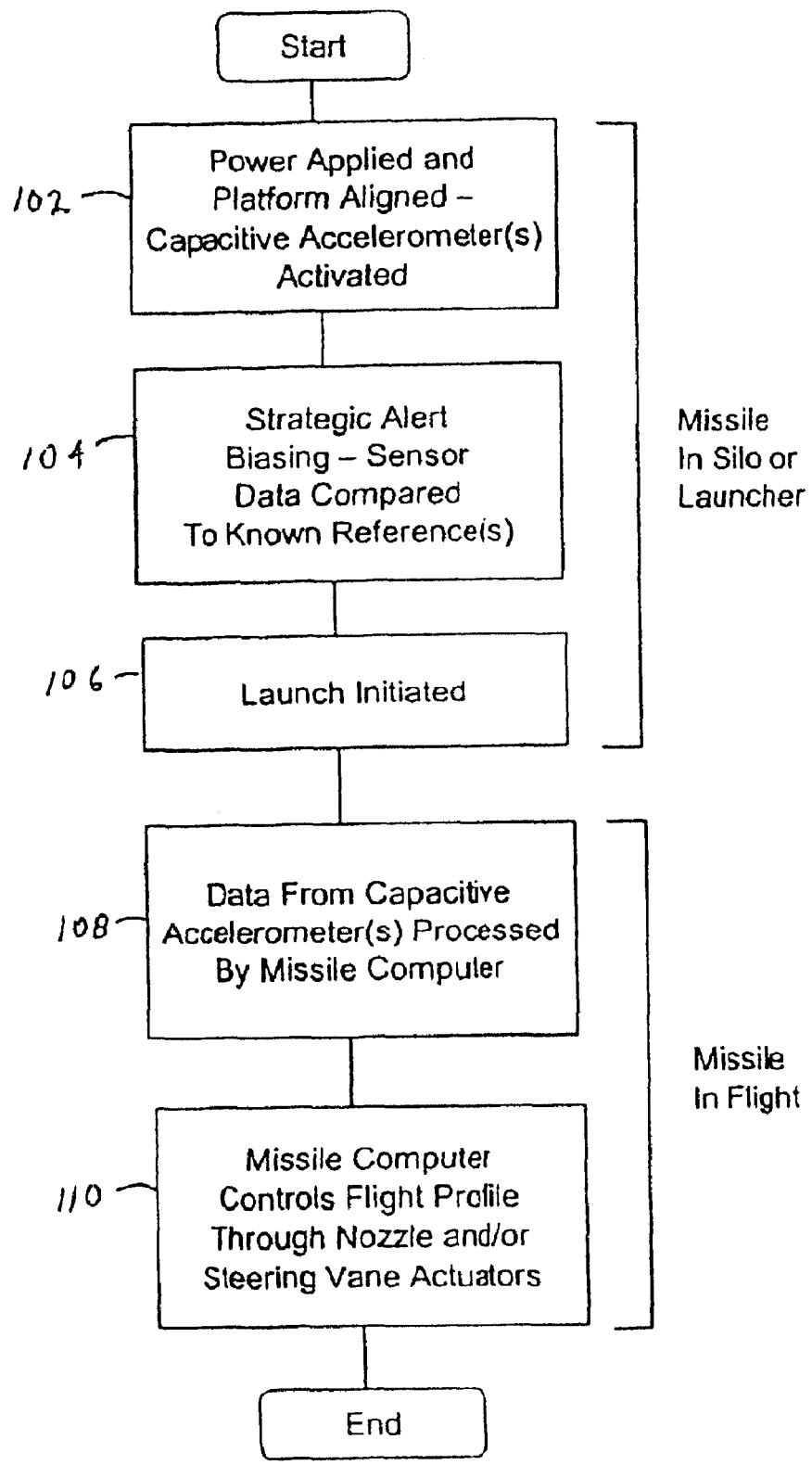
FIG. 4 illustrates a logic flow diagram of the aeronautical system of FIG. 1 in operation, in accordance with another embodiment of the present invention.

Referring to FIG. 4, a logic flow diagram 100 illustrating a method for acceleration control is illustrated. Logic starts in operation block 102 where power is applied to the system and the capacitive accelerometer 12, 15, or 17 is activated.

In operation block 104, strategic alert biasing occurs and sensor data is compared to a known reference.

In operation block 106, the missile system 10 is launched.

In operation block 108, the missile system 10 accelerates and the flexure plate flexes to either increase or decrease $d_1$ or $d_2$ for any of the three accelerometers 12, 15, or 17. The transimpedance amplifiers 22, 24, 26, 28, 30, 32 activate and receive signals from the fixed plate capacitors, which are generated in response to a change in either $d_1$ or $d_2$ for 12, 15, or 17. Notably, a change in $d_1$ will resultantly cause a change in $d_2$. The transimpedance amplifiers, e.g. 22, 24 then generate scaled voltage signals in response to the fixed plate capacitor signals. The scaled voltage signals from the transimpedance amplifiers 22, 24 are received in the amplifier 62 to generate a nonlinear overall frequency signal.

In operation block 108, the overall frequency signal, i.e. the results of the acceleration, are time integrated in the time integrator 66, thereby generating an initialized time integrated signal. The time integrated signal is then linearized. This linearization is achieved through a linear lookup table (linearizer 68), or other linearization methods known in the art. Data from the accelerometer(s) is processed by the missile computer/processor 14 or attitude controller.

In operation, a method for operating a capacitance acceleration derivative detector system 11 includes accelerating the flexure plate 30, thereby causing a first distance between the flexure plate and a first fixed plate to change and thereby causing a second distance between the flexure plate and a second fixed plate to change. A first variable capacitor signal is then generated, and a first scaled voltage signal is generated in response to the first variable capacitor signal. A second variable capacitor signal is generated, and a second scaled voltage signal is generated in response to the second variable capacitor signal. An acceleration signal is generated in response to the first scaled voltage signal and the second scaled voltage signal.

This process is typically engaged when a missile is at rest, prior to launch, or in flight.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration control. Numerous and other arrangements would be evident to those skilled in the art without departing from the scope of the invention as defined by the following claims.

What is claimed is:

1. A capacitance acceleration derivative detector system comprising:
    a housing;
    a first plate fixed within said housing;
    a second plate fixed within said housing spaced apart from and in parallel relation to said first plate;
    a flexure plate disposed between and in substantially parallel relation to said first and second plates, said flexure plate coupled to said housing along at least an edge, said flexure plate and said first plate defining a first distance and said flexure plate and said second plate defining a second distance,
    wherein said first and said second distances vary in response to acceleration forces acting upon said flexure plate, and wherein said first plate and said flexure plate generate a first charge displacement capacitance signal, and said second plate and said flexure plate generate a second charge displacement capacitance signal;
    a first transimpedance amplifier receiving said first charge displacement capacitance signal and generating a first scaled voltage signal therefrom; and
    a second transimpedance amplifier receiving said second charge displacement capacitance signal and generating a second scaled voltage signal therefrom,
    wherein an acceleration signal is generated from said first scaled voltage signal and said second scaled voltage signal.

2. The system of claim 1 further comprising a differential amplifier adjusting a gain of said first scaled voltage signal and said second scaled voltage signal and generating a voltage differential signal therefrom.

3. The system of claim 2 further comprising an analog-to-digital converter receiving said voltage differential signal and generating a digital voltage signal therefrom.

4. The system of claim 3 further comprising a time integrator integrating said digital voltage signal in response to initialization parameters and generating an integrated signal therefrom.

5. The system of claim 4 further comprising a linearizer receiving said integrated signal and generating therefrom a linearized acceleration signal.

6. The system of claim 5 wherein said linearizer comprises a linear lookup table.

7. The system of claim 5 further comprising an actuator activating a system component in response to a system control signal; and a processor receiving said linearized acceleration signal and generating said system control signal in response thereto.

8. The system of claim 7 wherein said system component comprises a thruster or an attitude control device.

9. A method for operating a capacitance acceleration derivative detector system comprising:
    accelerating a flexure plate, thereby causing a first distance between the flexure plate and a first fixed plate to change and thereby causing a second distance between the flexure plate and a second fixed plate to change;
    generating a first variable capacitor signal;
    generating a first scaled voltage signal in response to said first variable capacitor signal;
    generating a second variable capacitor signal;
    generating a second scaled voltage signal in response to said second variable capacitor signal; and
    generating an acceleration signal in response to said first scaled voltage signal and said second scaled voltage signal.

10. The method of claim 9, wherein generating said acceleration signal further comprises gain adjusting said first scaled voltage signal and said second scaled voltage signal and generating a voltage differential signal therefrom.

11. The method of claim 10, wherein generating said acceleration signal further comprises generating a digital voltage signal from said voltage differential signal.

12. The method of claim 11, wherein generating said acceleration signal further comprises generating an integrated voltage signal in response to initialization parameters and integrating said digital voltage signal.

13. The method of claim 12, wherein generating said acceleration signal further comprises linearizing said integrated voltage signal and generating a linearized signal therefrom.

14. The method of claim 13, wherein generating said acceleration signal further comprises filtering said linearized signal and generating said acceleration signal therefrom.

15. The method of claim 14 further comprising activating an object control device in response to said acceleration signal.

16. A system for controlling acceleration including an object adapted to accelerate comprising:
    a platform;
    a first accelerometer coupled to said platform and comprising a first shared capacitor sensor comprising a housing, a flexure plate, comprising a first side, a second side and a common edge, said edge coupled to a housing structure,
    a first fixed plate coupled to said housing at a first distance from said first side of said flexure plate,
    a second fixed plate coupled to said housing structure at a second distance from said second side of said flexure plate and arranged substantially parallel with said first fixed plate,
    said flexure plate being flexible under acceleration forces wherein said first distance and said second distance vary as a function of said acceleration forces to generate a first charge displacement capacitance signal in response to change in said first distance and a second charge displacement capacitance signal in response to change in said second distance, a first transimpedance amplifier adapted to receive said first charge displacement capacitance signal and generate a first scaled voltage signal in response thereto, a second transimpedance amplifier adapted to receive said second charge displacement capacitance signal and generate a second scaled voltage signal in response thereto;

a differential amplifier adjusting a gain of said first scaled voltage signal and said second scaled voltage signal and generating a voltage differential signal therefrom;

an analog-to-digital converter receiving said voltage differential signal and generating a digital voltage signal therefrom;

a time integrator integrating said digital voltage signal in response to initialization parameters and generating an integrated signal therefrom;

a linearizer receiving said integrated signal and generating therefrom a linearized acceleration signal;

a processor coupled to said first accelerometer and adapted to receive said linearized acceleration signal and generate a system control signal in response thereto.

17. The system of claim 16 further comprising an object control device activating in response to said system control signal, said object control device comprising at least one of a thruster, an attitude control device, a missile steering nozzle, or a vane actuator.

18. The system of claim 16 further comprising a second accelerometer coupled to said platform orthogonal to said first accelerometer, said second accelerometer generating a second accelerometer signal in response to movement of the system, wherein said processor further generates said system control signal in response to said second accelerometer signal.

19. The system of claim 18 further comprising a third accelerometer, wherein said second and third accelerometers are arranged with said first accelerometer to receive cross axis thrust data, wherein said processor generates said system control signal in response to said cross axis thrust data.

20. The system of claim 19 further comprising a serial data bus receiving acceleration signals from said first, second and third accelerometers, said serial data bus exchanging information with said processor.

* * * * *